United States Patent [19]

Hajali et al.

[11] Patent Number: 5,172,764
[45] Date of Patent: Dec. 22, 1992

[54] PROCESS AND APPARATUS FOR GROUNDWATER EXTRACTION USING A HIGH VACUUM PROCESS

[75] Inventors: Paris A. Hajali, Tustin; William F. Revely, III, Moreno Valley, both of Calif.

[73] Assignee: Xerox Corporation, Stamford, Conn.

[21] Appl. No.: 651,880

[22] Filed: Feb. 7, 1991

[51] Int. Cl.$^5$ .................... E21B 43/18; E21B 43/34
[52] U.S. Cl. ........................... 166/267; 166/67; 166/370
[58] Field of Search ............... 166/267, 369, 370, 371, 166/372, 68, 67

[56] References Cited

U.S. PATENT DOCUMENTS

| | | | |
|---|---|---|---|
| Re. 33,102 | 10/1989 | Visser et al. | 166/267 |
| 3,743,355 | 7/1973 | Blackwell et al. | 299/12 |
| 4,323,122 | 4/1982 | Knopik | 166/267 |
| 4,444,260 | 4/1984 | Boyd et al. | 166/267 |
| 4,593,760 | 6/1986 | Visser et al. | 166/267 |
| 4,660,639 | 4/1987 | Visser et al. | 166/267 |
| 4,730,672 | 3/1988 | Payne | 166/266 |
| 4,886,119 | 12/1989 | Bernhardt et al. | 166/267 |
| 4,890,673 | 1/1990 | Payne | 166/266 |
| 4,892,664 | 1/1990 | Miller | 210/747 |
| 4,895,085 | 1/1990 | Chips | 405/128 X |
| 4,945,988 | 8/1990 | Payne et al. | 166/266 |
| 4,982,788 | 1/1991 | Donnelly | 166/267 X |
| 5,009,266 | 4/1991 | Dieter | 166/267 X |
| 5,018,576 | 5/1991 | Udell et al. | 166/272 |
| 5,050,676 | 9/1991 | Hess et al. | 166/267 |
| 5,076,360 | 12/1991 | Morrow | 166/267 |

OTHER PUBLICATIONS

Stinson, "EPA Site Demonstration of the Terra Vac In Situ Vacuum Extraction Process in Groveland, Mass.", Air & Waste Management Assoc., vol. 39, No. 8, pp. 1054-1062 (1989).
"Forced Venting to Remove Gasoline Vapor from a Large-Scale Model Aquifer", American Petroleum Institute, Health and Environmental Sciences Dept., API Publication No. 4431 (1984).
"Venting for the Removal of Hydrocarbon Vapors from Gasoline Contaminated Soil", J. Thornton and W. Wootan, J. Environ. Sci. Health, A17(1), 31-44 (1982).

*Primary Examiner*—Hoang C. Dang
*Attorney, Agent, or Firm*—Judith L. Byorick

[57] ABSTRACT

Disclosed is a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Also disclosed is an apparatus for carrying out the process.

22 Claims, 4 Drawing Sheets

PROCESS AND APPARATUS FOR GROUNDWATER EXTRACTION USING A HIGH VACUUM PROCESS

BACKGROUND OF THE INVENTION

This invention is directed to a process and apparatus for removing chemical contaminants from groundwater. More particularly, the present invention is directed to a process and apparatus in which vacuum extraction is used to remove soil contaminants in both the saturated and vadose zones. One embodiment of the present invention is directed to a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Another embodiment of the present invention is directed to an apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having an opening situated near, at, or at any point below the water table within the perforated riser pipe, a means for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a common stream, and a means for receiving the common stream and separating the stream into separate gas and liquid streams.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323,122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al.), the disclosure of which is totally incorporated herein by reference, and U.S. Pat. No. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction wells.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A17(1), 31–44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 4,892,664 (Miller), the disclosure of which is totally incorporated herein by reference, discloses a method and system for decontaminating water, such as groundwater or process effluent, which is contaminated by small concentrations of dissolved volatile organic compounds. The process includes introducing a flow of the water to an air stripping stage in which the water is directed through the column to air strip organic molecules from the contaminated water, releasing the decontaminated water to the environment, pretreating the organic compounds carrying air in the substantial absence of water through a preheater, passing the heated air through a catalytic stage that oxidizes the organic compounds, and releasing the gaseous effluent from the catalytic stage to the atmosphere. Water containing small concentrations of dissolved volatile organic compounds can also be decontaminated by including an apparatus for retrofitting an existing air stripper for this purpose.

Further, U.S. Pat. No. 4,444,260 (Boyd et al.) discloses a method for the treatment of oil well production streams to process oil-contaminated sand to recover oil therefrom and produce an ecologically acceptable clean sand residue. The process entails separating the production fluid from an oil well having sand entrained therein from a plurality of components, one of which comprises an oil-contaminated sand. The contaminated sand is contacted with a light oil solvent to initiate a solvating action of the oil contaminant. The resulting mixture of oil-contaminated sand and solvent is then contacted with water and the system then gravity separated into discrete sand, water, and oil phases. The oil and water phases can be removed from the sand and the sand phase again contacted with water and the resulting mixture is then subjected to gravity separation to produce separate sand and water phases. The water phase is then removed and the sand passed to a suitable disposal facility.

Additionally, U.S. Pat. No. 4,730,672 (Payne) and U.S. Pat. No. 4,890,673 (Payne), the disclosures of each of which are totally incorporated herein by reference, disclose a method and apparatus for collecting volatile contaminants from the vadose layer of earth. The apparatus is a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

U.S. Pat. No. 4,945,988 (Payne et al.), the disclosure of which is totally incorporated herein by reference, discloses a process for removing and disposing of or neutralizing volatile contaminants existing in the vadose zone of earth and also in a below ground aquifer. The process includes the injection of substantially oxygen free air into the aquifer to retard the formation of aerobic bacteria and injection of oxygen rich air into the vadose zone to stimulate bacterial growth which aids contaminant recovery. Volatilized contaminants are pulled out of the soil through withdrawal wells which terminate in the vadose zone.

U.S. Pat. No. 4,886,119 (Bernhardt et al.) discloses a process for driving volatile impurities from a ground by means of air by aspirating an afterflow air and impurities containing gases which penetrated through a permeable wall of a shaft in a ground, at one or several locations. In regions of expected high gas contents, air afterflow passages are extended to these regions for supplying the afterflow air, and an adjustable afterflow resistance is arranged in the passages for influencing a negative pressure value and a flow speed in these regions.

U.S. Pat. No. 3,743,355 (Blackwell et al.) discloses a method for withdrawing hazardous gases from a water saturated subterranean formation containing a mineral deposit suitable for mining. The process entails drilling wells through the subterranean formation and withdrawing water from the subterranean formation to establish permeability to gas within the subterranean formation. Gas is then withdrawn from the formation by means of the wells. The method is particularly applicable for reducing the influx of radon into a mine contained in a mineral deposit.

U.S. Pat. No. 5,050,676 (Hess et al.) the disclosure of which is totally incorporated herein by reference, discloses a process for extracting contaminants from soil both above and below the water table. The process comprises placing a perforated riser pipe in a borehole in a selected portion of the contaminated area, wherein the perforations of the riser pipe are situated below the water table. Optionally, some of the perforations in the riser pipe can also be situated in the vadose zone above the water table. A vacuum is then applied to the pipe to draw gases and liquids from the soil into the pipe and to transport the gases and liquids to the surface as a common stream. At the surface, the common stream is separated into a primarily liquid stream and a primarily gaseous stream, and the separated streams then treated separately.

Although known apparatuses and processes are suitable for their intended purposes, a need remains for a process and apparatus for removing contaminants from groundwater and soil which enables contaminant removal from below and/or above the water table. A need also remains for a process and apparatus for removing contaminants from groundwater and soil which enables contaminant removal from soils of varying air permeability and varying porosity. Further there is a need for a process and apparatus for removing contaminants from groundwater and soil which enables increased flexibility in the location of extraction wells. There is also a need for a process and apparatus for removing contaminants from groundwater and soil that can be implemented by modifying existing vacuum extraction systems. In addition, there is a need for a process and apparatus for removing contaminants from groundwater and soil that enables extraction of contaminants both from the vadose zone and from below the water table through an extraction well having a riser pipe with perforations both above and below the water table. Further, a need exists for a process and apparatus for removing contaminants from groundwater and soil that enables vacuum extraction of contaminants through a well from below the water table when the water table is deeper than the equivalent lift of the vacuum pump connected to the well. There is also a need for a process and apparatus for removing contaminants from groundwater and soil with simplified equipment in that a single vacuum pump can be employed to remove contaminants in both the vapor and liquid phases through a single well or pipe. Additionally, there is a need for a process and apparatus for removing contaminants from groundwater and soil that enables reduction of contaminant concentrations in the extracted groundwater as a result of the mixing of air and water in the vacuum extraction pipe, leading to reduced subsequent water treatment requirements. In addition, there is a need for a process and apparatus for removing contaminants from groundwater and soil that dewaters the saturated zone (groundwater) in the vicinity of the extraction well in some soil conditions, thereby allowing air flow to move through the dewatered soil, which accelerates the extraction rate of contaminants and results in reduced cleanup time. Further, there is a need for a process and apparatus for removing various kinds of contaminants from groundwater and soil, including volatile materials, nonvolatile materials, metal contaminants, and the like.

SUMMARY OF THE INVENTION

It is an object of the present invention to provide a process and apparatus for removing contaminants from groundwater and soil which enables contaminant removal from below and/or above the water table.

It is another object of the present invention to provide a process and apparatus for removing contaminants from groundwater and soil which enables contaminant removal from soils of varying air permeability and varying porosity.

It is yet another object of the present invention to provide a process and apparatus for removing contaminants from groundwater and soil which enables increased flexibility in the location of extraction wells.

It is still another object of the present invention to provide a process and apparatus for removing contaminants from groundwater and soil that can be implemented by modifying existing vacuum extraction systems.

Another object of the present invention is to provide a process and apparatus for removing contaminants from groundwater and soil that enables extraction of contaminants both from the vadose zone and from below the water table an extraction well having a riser pipe with perforations both above and below the water table.

Yet another object of the present invention is to provide a process and apparatus for removing contaminants from groundwater and soil that enables vacuum extraction of contaminants through a well from below the water table when the water table is deeper than the equivalent lift of the vacuum pump connected to the well.

Still another object of the present invention is to provide a process and apparatus for removing contaminants from groundwater and soil with simplified equipment in that a single vacuum pump can be employed to remove contaminants in both the vapor and liquid phases through a single well or pipe.

Another object of the present invention is to provide a process and apparatus for removing contaminants from groundwater and soil that enables reduction of contaminant concentrations in the extracted groundwater as a result of the mixing of air and water in the vacuum extraction pipe, leading to reduced subsequent water treatment requirements.

Yet another object of the present invention is to provide a process and apparatus for removing contaminants from groundwater and soil that dewaters the saturated zone (groundwater) in the vicinity of the extraction well in some soil conditions, thereby allowing air flow to move through the dewatered soil, which accelerates the extraction rate of contaminants and results in reduced cleanup time.

Still another object of the present invention is to provide a process and apparatus for removing various kinds of contaminants from groundwater and soil, including volatile materials, nonvolatile materials, metal contaminants, and the like.

These and other objects of the present invention (or specific embodiments thereof) can be achieved by providing a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Another embodiment of the present invention is directed to an apparatus for removing contaminants from a contaminated area of the ground having a vadose zone and a water table which comprises a perforated riser pipe extending downwardly from the surface of the ground into at least the vadose zone, a vacuum extraction pipe situated inside of the riser pipe and having an opening situated near, at, or at any point below the water table within the perforated riser pipe, a means for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a common stream, and a means for receiving the common stream and separating the stream into separate gas and liquid streams.

BRIEF DESCRIPTION OF THE DRAWINGS

Illustrated schematically in FIG. 1 is a side elevation view in cross section illustrating an arrangement for vacuum extraction of contaminants from a contaminated area of the ground in accordance with the present invention.

Illustrated schematically in FIG. 2 is a cross-sectional view in side elevation of an extraction well suitable for the present invention.

Illustrated schematically in FIG. 3 is a schematic view of an example of an apparatus for handling and treating materials removed from the ground by the vacuum extraction apparatus and process of the present invention.

Illustrated schematically in FIG. 4 is a cross-sectional view in side elevation of an air inlet well suitable for use with the present invention.

DETAILED DESCRIPTION OF THE INVENTION

The present invention is directed to a process and apparatus for the removal of contaminants from groundwater and soil. Contaminants can be present in the vadose zone and/or below the water table. The process comprises the steps of providing a borehole in the contaminated area, placing in the borehole a perforated riser pipe in which is situated a vacuum extraction pipe with an opening situated near, at, or at any point below the initial water table within the perforated riser pipe, applying a vacuum to the riser pipe through the vacuum extraction pipe while introducing a gas into the riser pipe so as to draw soil gases and entrained liquid into the riser pipe and to transport both the gases and the liquid to the surface through the vacuum extraction pipe, separating the liquid and the gases, and separately subjecting the separated liquid and gases to appropriate treatment. Treated water can be returned to the soil or disposed of in conventional ways. In one embodiment of the invention, the riser pipe is constructed with perforations (screening) extending both below the natural water table and upward into the unsaturated (vadose) zone. In another embodiment of the invention, the riser pipe is constructed with perforations (screening) extending only below the water table. The unsaturated zone can be the natural vadose zone lying above the natural water table, or an expanded "artificial" vadose zone created when removal of the groundwater through the extraction well causes local lowering of the water table. Placing of the screening so that it extends both below the water table and into the vadose zone allows soil gases, including contaminants in the vapor phase, to be drawn into the riser pipe under the influence of a vacuum generator connected to the vacuum extraction pipe. The gases entrain the liquid phase, so that both phases can be transported to the surface together in a common stream through the vacuum extraction pipe. At the surface, the two phases are separated in a vapor-liquid disengaging vessel, such as a cyclone separator, knock-out pot or other suitable component, and after separation the phases can individually be routed to systems for contaminant removal by further treatment steps. Suitable processes for contaminant removal include filtration, adsorption, air stripping, settling, flocculation, precipitation, scrubbing and the like.

As an alternative, the riser pipe can be constructed so that the screening is at all times below the water table, even in the situation in which removal of water causes local depression of the water table. In such an arrangement, the fluid transported to the surface is predominantly in the liquid phase, although it may still be necessary to provide vapor-liquid separation and individual phase treatment at the surface to deal with phase transformation which may occur as a result of turbulence and pressure reduction at the suction side of the vacuum device.

Figure 1:
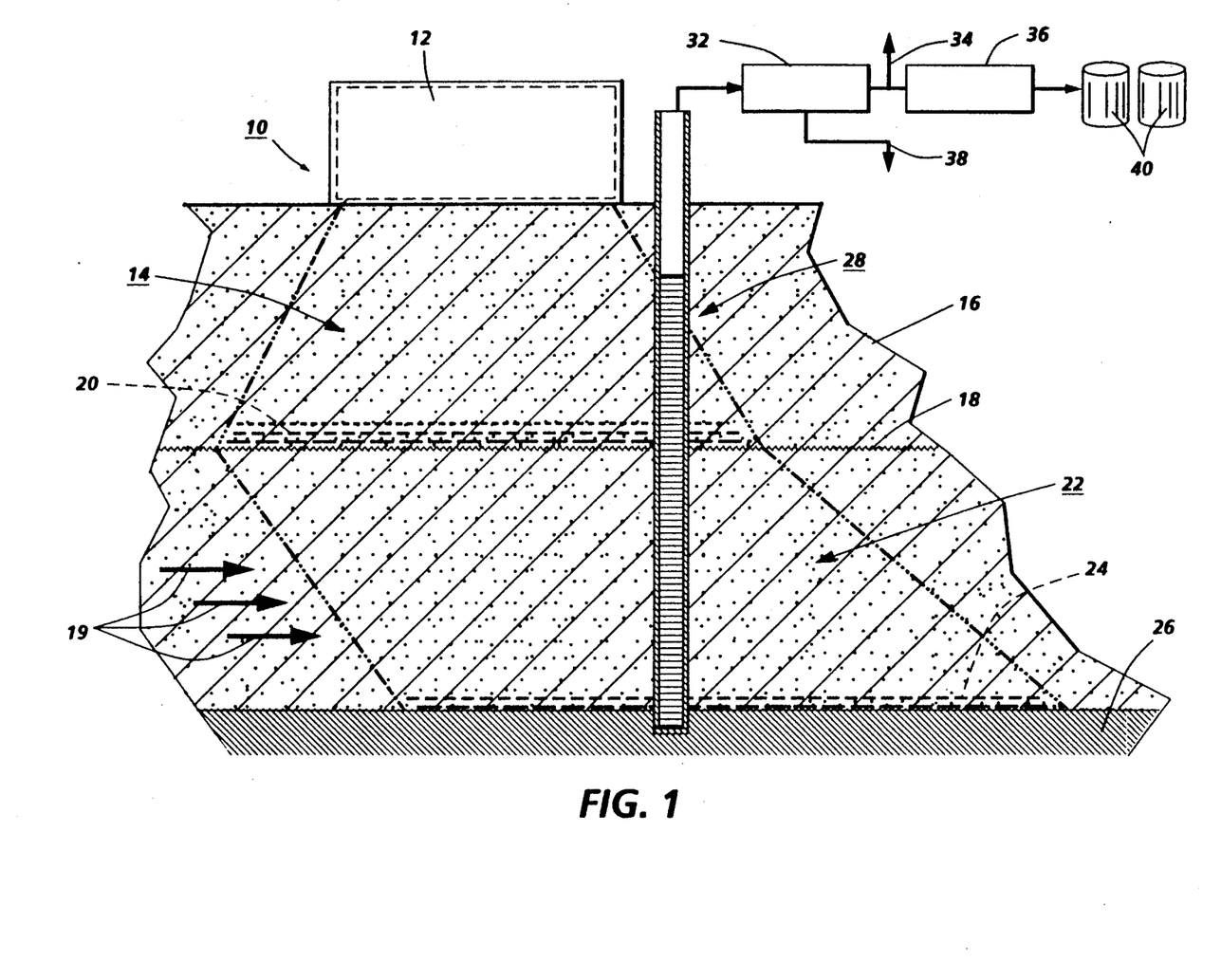

FIG. 1 illustrates schematically a system, designated generally by the reference numeral 10, for vacuum extraction and treatment in accordance with the invention. Seen in FIG. 1 is a source 12 of volatile contaminants, creating a plume 14 of adsorbed, dissolved, or suspended free phase and gaseous phase contaminants in the soil 16 of the vadose (unsaturated) zone. The contaminants making up the plume 14 tend to leach or percolate downwardly toward the natural water table 18. Groundwater is moving in the direction of the arrows 19. Components lighter than water and not dissolved are depicted by the reference numeral 20, and tend to float at the top of the water table. Dissolved contaminants tend to percolate downwardly in a plume 22 below the water table 18, and free-phase components 24 heavier than water tend to migrate downwardly to the aquitard 26.

An extraction well, designated generally by the reference numeral 28, and which will be described in greater detail shortly, is sunk in the area of the plume 14 and extends through the vadose zone and below the natural water table 18. Associated with the extraction well 28 is a vacuum extraction system, designated by the reference numeral 32, preferably designed to generate high vacuum conditions, typically from about 7 to about 29 inches of mercury. Gases removed by the vacuum extraction system 32 can be vented to atmosphere at 34 if within acceptable environmental limits, or further processed, such as by being incinerated or passed to a condenser, granular activated carbon filter, or other such component 36. The component 36 serves to remove contaminants from the extracted gases. Water extracted by the process can be treated by passing it through conventional systems for metals removal, volatile organic compound removal, or other steps of purification. The treated and purified water, if it is of sufficient purity at this stage, can be returned to a sewer or directly to the ground as indicated at 38. Contaminants can be stored in drums 40 for eventual destruction or further processing.

Figure 2:
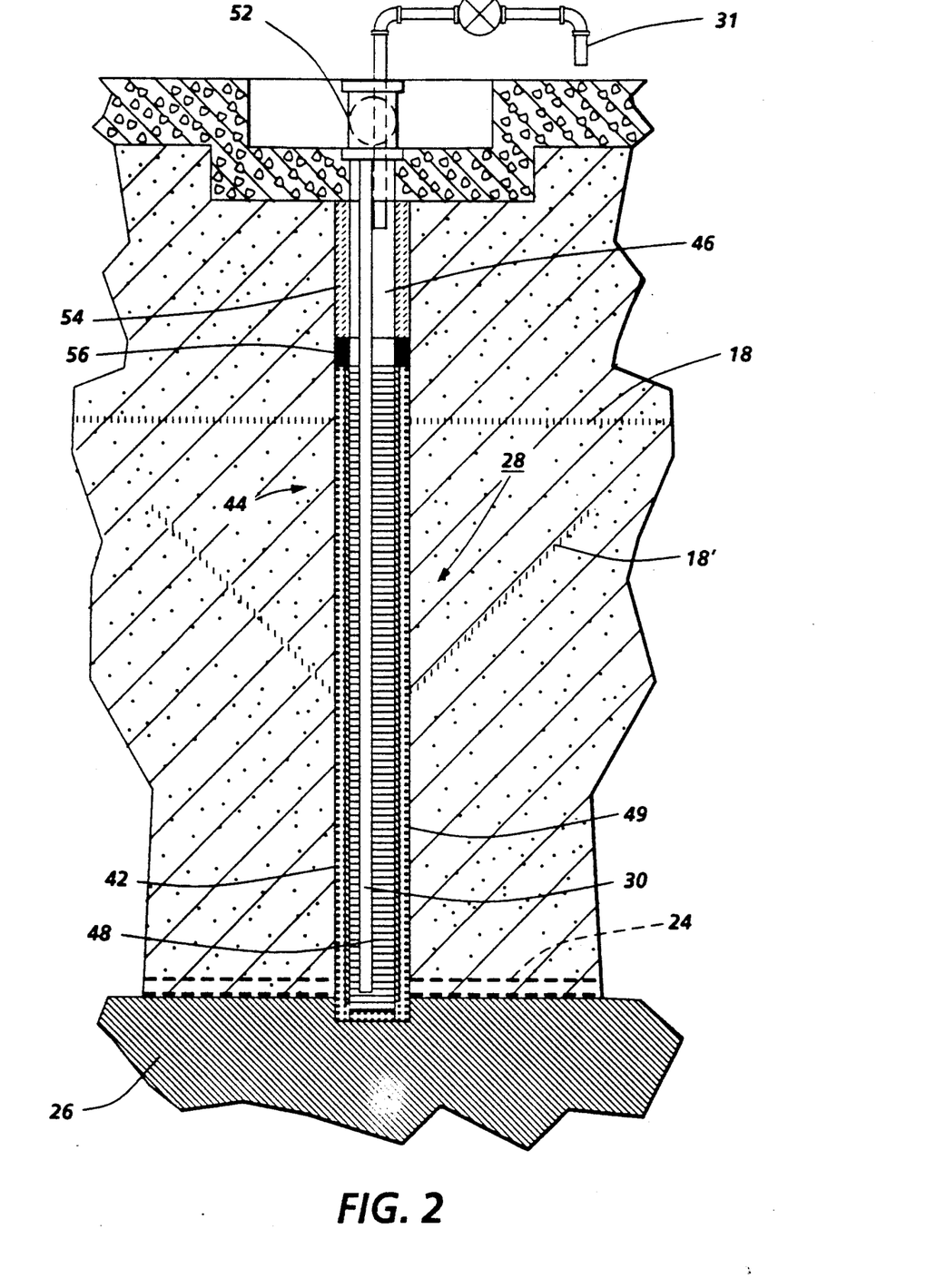

FIG. 2 illustrates the extraction well 28 in greater detail. The extraction well 28 in the illustrated form of the invention includes an elongated borehole 42, into which is placed a perforated riser pipe 44 capped at the bottom. The riser pipe 44 is perforated either below the water table or both below and above the water table. In the embodiment illustrated, the riser pipe includes an imperforate upper portion 46 and a perforate (screened) lower portion 48. The riser pipe 44 can be of any suitable material, such as polyvinyl chloride, metals, such as stainless steel, galvanized steel, or the like, plastics, including Teflon ®, or the like. The screened or perforate portion can have perforations of any desired or suitable shape and size; for example, in one embodiment, the perforated portion can be equipped with 0.010 inch slots. Situated inside riser pipe 44 is unperforated vacuum extraction pipe 30. The vacuum extraction pipe 30 can be of any suitable material, such as polyvinyl chloride, metals, such as stainless steel, galvanized steel, or the like, plastics, including Teflon ®, or the like. The upper end of the riser pipe 44 is here shown to be associated with a concrete floor or deck, and is provided with a suitable pipe fitting 52, enabling the riser pipe 44 and the vacuum extraction pipe 30 to be coupled to the remainder of the vacuum extraction system 32 (not seen in FIG. 2), with vacuum extraction pipe 30 being in fluid communication with the vacuum extraction system. Vacuum extraction pipe 30 can have an opening within the riser pipe 44 either below the water table, at the water table level, or slightly above but near to the water table. Also situated at the end of extraction well 28 at or near the ground surface is an air inlet 31, preferably equipped with an air flow gauge (not shown), which permits the introduction of air at any desired pressure, including reduced pressures, atmospheric pressure, or increased or forced pressures, into riser pipe 44. When it is desired to add air at pressures greater than atmospheric pressure, air pressure can be provided by an additional pump (not shown), by connecting the outlet or exhaust of the vacuum pump connected to vacuum extraction pipe 30 to air inlet 31, or the like. The air flow rate through air inlet 31 can range from nearly zero to any value less than the CFM rated capacity of the vacuum pump connected to vacuum extraction pipe 30. In addition, the air introduced through air inlet 31 can, if desired, be heated to improve the extraction of some contaminants. Further, air inlet 31 can be used as an inlet for introducing other materials or chemicals into the riser pipe and extraction stream, since chemicals or materials so introduced will pass down with the inlet air through the riser pipe to the bottom thereof, and then back up with the water and air mixture through vacuum extraction pipe 30, thus chemically or otherwise interacting with the water and air mixture. For example, oxidizers or surfactants or other chemicals can be introduced for the treatment of waterborne or vapor-borne contaminants removed by the vacuum extraction pipe. Liquid drawn up through vacuum extraction pipe 30 generally is in one or more of the following forms: slugs, droplets, mist, and vapor. Air flow through the system is provided by one or more of the following: air from the unsaturated (vadose) zone; air from the dewatered saturated zone; and air from the air inlet mechanism 31, at reduced pressures, atmospheric pressure, or forced pressures. Thus, it is not required that air be extracted from the ground in the vicinity of the extraction well. Generally, a high vapor-/air velocity is maintained through the system. Air velocity in the vacuum extraction pipe should be sufficient to carry or lift water in the vapor phase, either droplets of various sizes, or slugs, or the like, entrained in the air. Air velocity values in the range of 2,500 feet per minute or greater generally suffice.

The upper portion 46 of the riser pipe 44 is surrounded by a low permeability grout, such as bentonite cement 54, and below the grout 54 by a bentonite seal 56. The area within the borehole 42 surrounding the slotted lower portion 48 of the riser pipe 44 and part of the upper portion 46 above the slotted lower portion 48 is packed with fine screened sand 49, to facilitate the flow of gas and liquid from the surrounding soil into the riser pipe 44. In a preferred form of the invention, the extraction well 28 is constructed so that the screened lower portion 48 extends below the natural water table and upwardly into the vadose zone. The vadose zone into which the screened lower portion 48 extends can be the natural water table 18, or the expanded artificial vadose zone created when prolonged removal of groundwater through the extraction well causes local lowering of the water table, as indicated by the reference numeral 18' in FIG. 2. Placement of the screened lower portion 48 of the riser pipe 44 both below the water table and in the vadose zone allows soil gases (the vapor phase) to be drawn into the well under the influence of vacuum created by the extraction system 32 and to entrain the liquid phase so that both phases can be transported to the surface together. As will be explained, at the surface, the two phases can be separated and differently treated.

Alternatively (not shown), the extraction well 28 can be so constructed that the screening of the lower portion 48 is entirely submerged, i.e., disposed below the natural or actual water table, even after withdrawal of water under the influence of the vacuum extraction system 32. In the latter case, the fluid transported to the surface is predominantly in the liquid phase, although the influence of the vacuum generally results in the presence of a gas phase comprising volatilized liquids.

Figure 3:
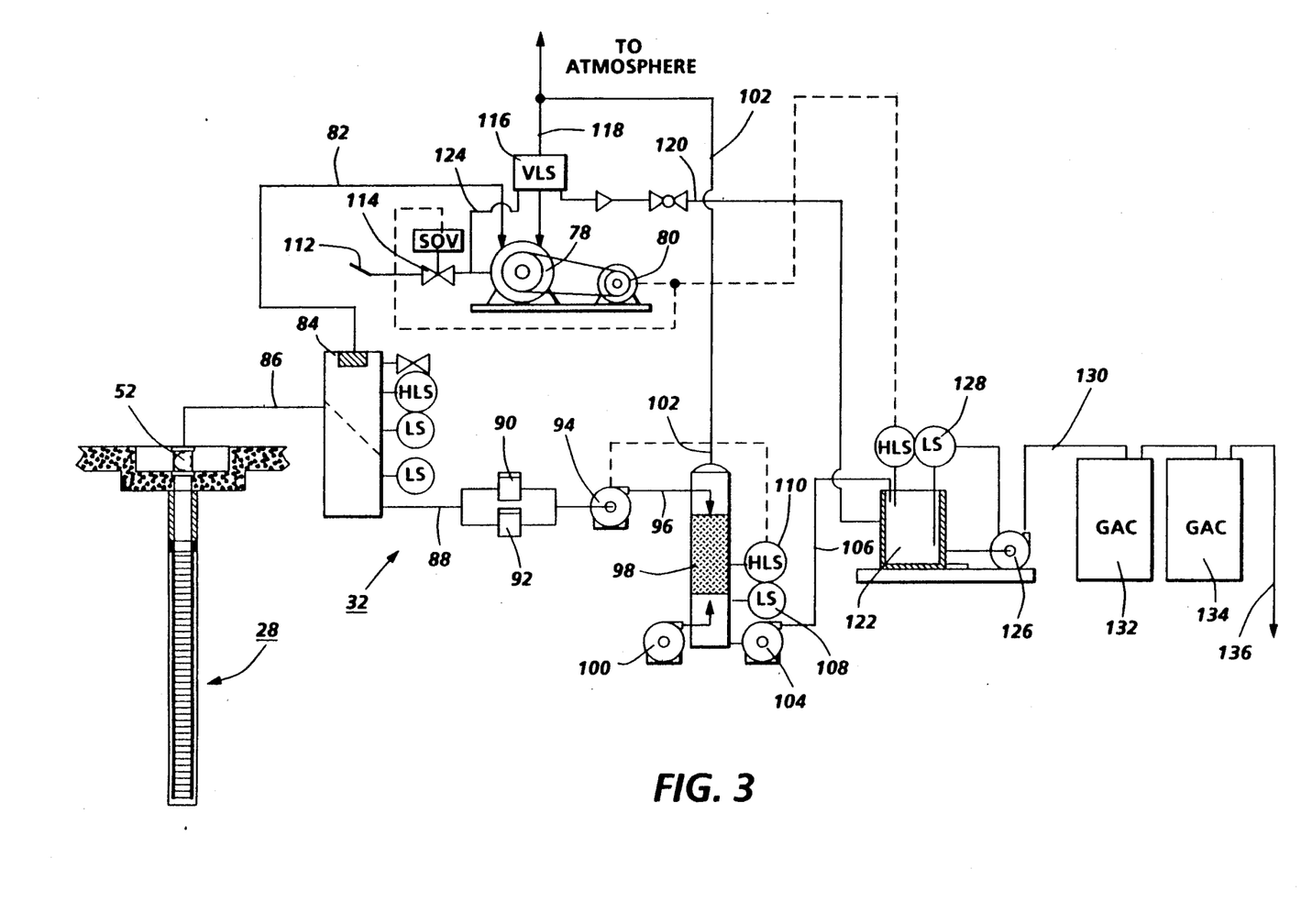

FIG. 3 illustrates schematically in greater detail the vacuum extraction system 32 and the steps and apparatus for treating extracted material. A vacuum pump 78, driven by electric motor 80, is in fluid communication through a pipe 82, knock-out pot 84 and pipe 86 with the pipe fitting 52 of extraction well 28. The knock-out pot 84 can be conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the liquid phase through filtration and stripping steps. Filtration is provided in the illustrated embodiment by parallel filters 90 and 92 which can alternately or simultaneously be used in a conventional manner. Cut-off valves, omitted in the drawings for clarity, permit either filter 90 or 92 to be isolated and each filter to be removed, cleaned, or replaced. Suitable pressure gauges (not shown) can be placed on the suction and discharge sides of the filters 90 and 92 to indicate filter loading. Examples of suitable filters 90 and 92 include SQ micron nylon filters, sold by Rosedale Products, Incorporated, capable of passing 222 gpm at 150 psi. Other separation techniques and apparatus can also be used.

A pump 94, for erosion resistance preferably of the single stage progressive cavity (screw) type, serves to draw off the liquid phase effluent of the knock-out pot 84. An example of a suitable pump is sold by the Nemo Pump Division of Netzsch Incorporated, of Exton, Pa., Model Ne-30A. Here, too, other suitable apparatus can be used.

In the illustrated embodiment, the liquid phase is fed from the pump 94 through a pipe 96 to an optional air stripper assembly 98, the function of which is to remove from the effluent volatile organic compounds. A blower 100 associated with the air stripper assembly 98 delivers a flow of warm air through the housing of the air stripper assembly 98, carrying off the volatile organic compounds through the vent 102 to atmosphere or further processing (not shown). A transfer pump 104, discharging to a pipe 106, serves to transport liquid from the sump of the air stripper assembly 98 for further processing. The transfer pump 104 can be turned off in response to a low level switch 108 associated with the air stripper assembly 98. A high level switch 110 associated with the air stripper assembly 98 controls the pump 94 in response to high water level in the air stripper assembly 98. The air stripper assembly 98 can be a conventional "off-the-shelf" unit, familiar to those skilled in the art.

The optional air stripper assembly 98 can, if desired, be omitted, and the effluent of the pipe 96 joined with the effluent of the pipe 120. It is hypothesized that the intimate mixing of the air and water during extraction (at which time groundwater is extracted in an air stream under vacuum) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

As indicated above, under the influence of the vacuum pump 78 the vapors separated from the two-phase effluent from the extraction well 28 are drawn to vacuum pump 78. In the illustrated embodiment of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 can be drawn off through a line 124 to join the flow in the make up water line 112 servicing the liquid ring pump 78.

A pump 126, controlled by a low level cut-off switch 128, draws liquid from the sump 122 and propels it through a pipe 130 for further processing. In the illustrated embodiment, the liquid is passed in two stages through canisters 132 and 134 containing granular activated carbon. Other contaminant removal steps or techniques can be used. The treated water emerges through a pipe 136 and is of sufficient purity to allow its return to the soil or a sewer without further treatment.

Figure 4:
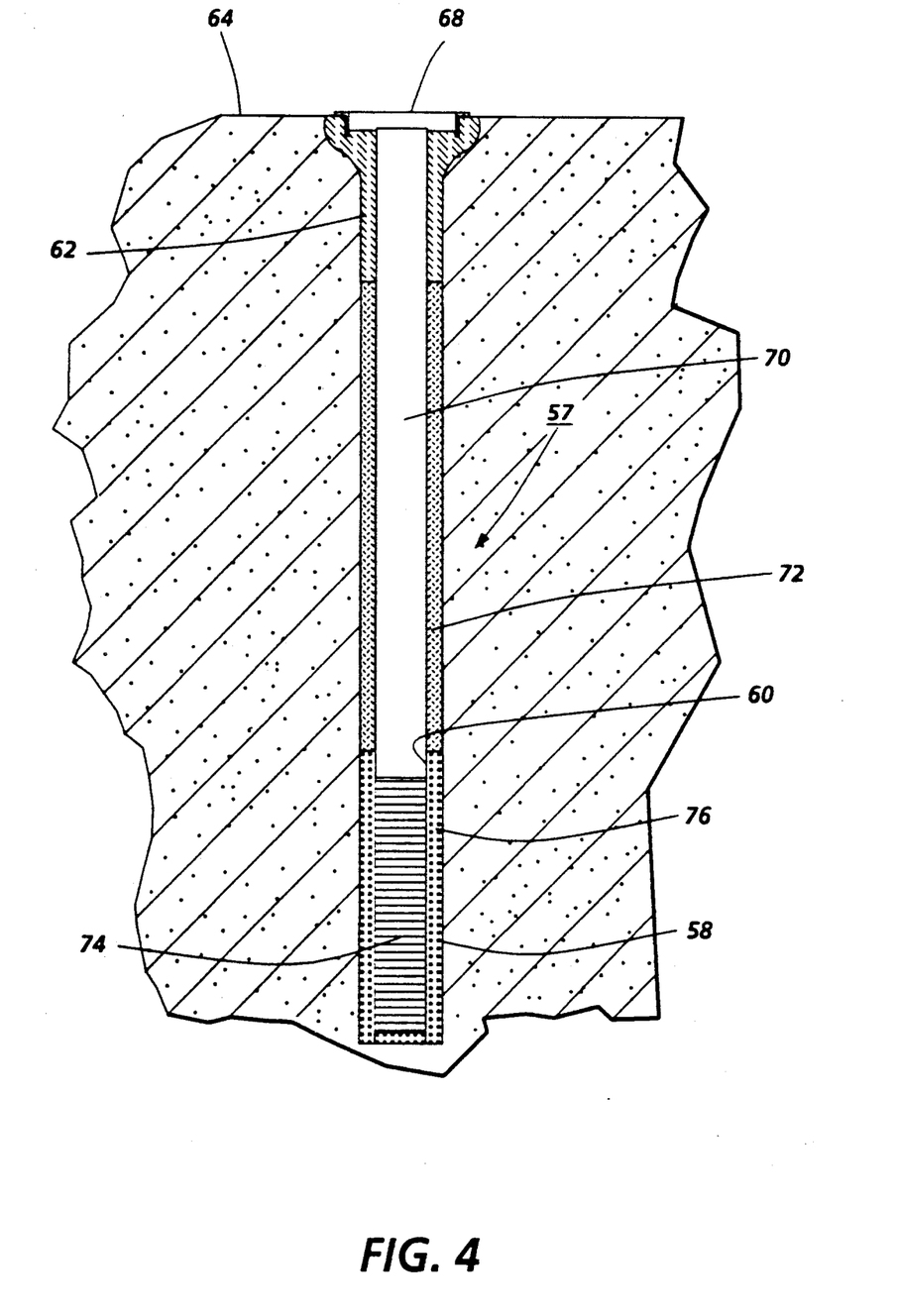

FIG. 4 illustrates schematically an example of an optional air inlet well 57. The air inlet well 57 comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar 62, extending to the ground surface 64. Suitable covers 68 can be provided in association with the collar 62 to cover selectively the injection well as desired. Cover 68 generally is air permeable, at least to some extent. Surrounding a medial portion 70 of the pipe 60 within the borehole 58 is a bentonite slurry 72, which provides a gas-tight seal between the pipe 60 and the borehole 58. the slotted lower portion 74 of the pipe 60 is surrounded by gas-permeable packed sand 76. As will now be apparent, the pipe 60 facilitates the injection of air into the zone surrounding the plume 14 (shown in FIG. 1).

One advantage of the application of vacuum extraction in accordance with the present invention is that the rate of production of groundwater may be significantly increased over conventional single phase flow rates. By applying vacuum to the subsurface using the vacuum extraction pipe 30 and vacuum extraction system 32 as described above, water is drawn from the soil by the fluid dynamic effects of sweeping air and soil gases over the aquifer surface toward the well and also by the artificial creation of a low head (water pressure) inside the riser pipe 44. The low head in the riser pipe 44 makes it, in effect, a low point in the hydraulic system so that water in the surrounding soil readily flows to it.

Artificially increasing the rate of production of groundwater over what can be achieved with conventional pumps is especially beneficial in subsurface formations through which natural recharge is slow. In addition to increasing the size of the groundwater capture zone around the extraction well 28, operation of the above-described apparatus 10 depresses the natural water table, thereby increasing the volume of the vadose zone which is subject to clean up by the vapor extraction mechanism generated by the apparatus 10. Tangible benefits include shortening of the duration of the treatment time and reduction of the cost of the overall contaminant removal effort.

The apparatus and process of the present invention, being equipped with the vacuum extraction pipe and the air inlet means, enable removal of liquid and/or gaseous contaminants from soils of varying air permeability and varying porosity, since the extraction system no longer depends upon the air permeability or porosity conditions of the soil to provide air flow and water flow into the riser pipe sufficient to match the vacuum pump characteristics. The air inlet, when equipped with a valve, allows the adjustment of the introduced air flow to match the specific site soil conditions. The air inlet and valve provide air to displace water from the well through the vacuum extraction pipe. In addition, the present invention enables increased flexibility in the location of extraction wells, since soil conditions with respect to air flow through the soil are not critical, thus allowing the well to be situated in areas of greatest contamination without considering irregular or difficult soil conditions in those areas. Further, the vacuum extraction pipe and the air inlet mechanism enable vacuum extraction of contaminants through wells from below the water table even when the water table is deeper than the equivalent lift of the vacuum pump connected to the well. Thus, existing wells equipped with vacuum pumps can be modified by the addition of a vacuum extraction pipe and an air inlet mechanism as provided with the present invention, thus enabling the existing pump to remove contaminants from below the water table. In addition, when the water table is at a depth of greater than about 35 feet, the lift required to remove liquid contaminants can be expected to be greater than any commercially available vacuum pump; the apparatus and process of the present invention, however, enable removal of liquid and gaseous contaminants even from depths of 35 feet or greater. Nearly any rate vacuum pump can be used for extraction with the present invention; a low CFM rate pump can still extract water from a substantial depth of water table. Additionally, the apparatus and process of the present invention are suitable for extraction of contaminants by systems equipped to extract from only below the water table and by systems equipped to extract from both the vadose zone and below the water table.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for removing contaminants from a contaminated area of the ground having a vadose zone and water table which comprises providing a borehole in the contaminated area to a depth below the water table; placing in the borehole to a depth below the water table a perforated riser pipe inside of which is situated a vacuum extraction pipe with an opening situated within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams.

2. A process according to claim 1 wherein the perforations in the riser pipe are situated only below the water table.

3. A process according to claim 1 wherein the perforations in the riser pipe are situated both inthe vadose zone and below the water table 4. A process according to claim 1 wherein gas is introduced into the riser pipe at a pressure less than atmospheric pressure.

5. A process according to claim 1 wherein gas is introduced into the riser pipe at atmospheric pressure.

6. A process according to claim 1 wherein gas is introduced into the riser pipe at a pressure greater than atmospheric pressure.

7. A process according to claim 1 wherein the gas is heated prior to being introduced into the riser pipe.

8. A process according to claim 1 wherein the gas introduced into the riser pipe contains a material capable of interacting chemically with soil contaminants extracted through the cacuum extraction pipe.

9. A process according to claim 1 wherein the vacuum applied to the vacuum extraction pipe extracts gases from the liquid during transport of the common stream to the surface.

10. A process according to claim 1 wherein the opening of the vacuum extraction pipe is situated above the water table within the perforated riser pipe.

11. A process according to claim 1 wherein the opening of the vacuum extraction pipe is situated below the water table within the perforated riser pipe.

12. An apparatus for removing contaminants from a contaminated area of the ground having a water table and a vadose zone above the water table which comprises a perforated riser pipe extending downwardly from the surface of the ground to a level below the water table, a vacuum extraction pipe situated inside of the riser pipe and having an opening situated within the perforated riser pipe, a means for introducing a gas into the riser pipe, a vacuum-forming apparatus in fluid communication with the vacuum extraction pipe and adapted to form a zone of reduced pressure in the ground around the riser pipe, whereby gases and liquid can be drawn from the ground into the riser pipe and from the riser pipe into the vacuum extraction pipe and conveyed to the surface as a common stream, and a means for receiving the common stream and separating the stream into separate gas and liquid streams.

13. An apparatus according to claim 12 wherein the perforations in the riser pipe are situated only below the water table.

14. An apparatus according to claim 12 wherein the perforations in the riser pipe are situated both in the vadose zone and below the water table.

15. An apparatus according to claim 12 wherein the means for introducing a gas into the riser pipe is equipped with a pump capable of delivering the gas at a pressure greater than atmospheric pressure.

16. An apparatus according to claim 12 wherein the means for introducing a gas into the riser pipe is connected to an exhaust means of the vacuum-forming apparatus, thereby rendering the means for introducing a gas capable of delivering the gas at a pressure greater than atmospheric pressure.

17. An apparatus according to claim 12 wherein the means for introducing a gas into the riser pipe is equipped with a means for heating the gas prior to its introduction into the riser pipe.

18. An apparatus according to claim 12 wherein the means for introducing a gas into the riser pipe is equipped with a source of a material capable of interacting chemically with soil contaminants extracted through the vacuum extraction pipe.

19. An apparatus according to claim 12 also including a means for receiving the gas stream and removing therefrom residual liquid, a vessel for receiving the residual liquid from the gas stream and the liquid stream, and a means for removal of residual contaminants from the liquid.

20. An apparatus according to claim 12 also including at least one air injection well extending downwardly from the surface of the ground and spaced from the riser pipe.

21. An apparatus according to claim 12 wherein the opening of the vacuum extraction pipe is situated above the water table within the perforated riser pipe.

22. An apparatus according to claim 12 wherein the opening of the vacuum extraction pipe is situated below the water table within the perforated riser pipe.

* * * * *